United States Patent
Boyd et al.

(10) Patent No.: US 11,204,959 B1
(45) Date of Patent: Dec. 21, 2021

(54) AUTOMATED RANKING OF VIDEO CLIPS

(71) Applicant: Snap Inc., Santa Monica, CA (US)

(72) Inventors: Nathan Kenneth Boyd, Los Angeles, CA (US); Maryam Daneshi, Redwood City, CA (US); Sivakumar Loganathan, San Francisco, CA (US); Satya Kanduri, Mountain View, CA (US); Senthil Karthikeyan Sundaram, San Francisco, CA (US); Evan Shaw, Emeryville, CA (US)

(73) Assignee: Snap Inc., Santa Monica, CA (US)

( * ) Notice: Subject to any disclaimer, the term of this patent is extended or adjusted under 35 U.S.C. 154(b) by 374 days.

(21) Appl. No.: 16/269,269

(22) Filed: Feb. 6, 2019

(51) Int. Cl.
*G06F 16/735* (2019.01)
*G06K 9/00* (2006.01)
*G06F 16/2457* (2019.01)
*G06F 16/78* (2019.01)
*G06F 16/71* (2019.01)

(52) U.S. Cl.
CPC ...... *G06F 16/735* (2019.01); *G06F 16/24578* (2019.01); *G06F 16/71* (2019.01); *G06F 16/7867* (2019.01); *G06K 9/00718* (2013.01); *G06K 2209/27* (2013.01)

(58) Field of Classification Search
CPC .... G06F 16/214; G06F 16/182; G06F 16/275; G06F 16/735; G06F 16/71; G06F 16/24578; G06F 16/7867; G06K 9/00718; G06K 2209/27
See application file for complete search history.

(56) References Cited

U.S. PATENT DOCUMENTS

| | | | | |
|---|---|---|---|---|
| 8,935,725 B1* | 1/2015 | Eswaran | .......... | H04N 21/47214 725/44 |
| 2008/0188964 A1* | 8/2008 | Bech | ....................... | G06F 16/68 700/94 |
| 2009/0169178 A1* | 7/2009 | Higgins | ............. | H04N 21/4331 386/239 |
| 2010/0070523 A1* | 3/2010 | Delgo | .................... | G11B 27/34 707/769 |
| 2014/0223482 A1* | 8/2014 | McIntosh | ............. | G11B 27/034 725/41 |
| 2015/0134673 A1* | 5/2015 | Golan | .................... | G06F 16/739 707/748 |
| 2016/0041998 A1* | 2/2016 | Hall | .................... | G06F 16/7867 707/725 |

(Continued)

*Primary Examiner* — Cam Y T Truong
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for ranking videos. The program and method include storing, in a database, a plurality of videos; obtaining, for a first of the plurality of videos, first data representing a first interaction performed by a creator of the first video in association with the first video; and obtaining, for the first video, second data representing a second interaction performed by a consumer of the first video in association with the first video. A score is computed for the first video based on the first and second data and the first video is ranked relative to a remaining subset of the plurality of videos by comparing the computed score for the first video with respective scores of videos in the remaining subset of the plurality of videos.

19 Claims, 10 Drawing Sheets

(56) References Cited

U.S. PATENT DOCUMENTS

| | | | | |
|---|---|---|---|---|
| 2017/0193117 A1* | 7/2017 | Reigen | .................... | H04L 67/02 |
| 2018/0052851 A1* | 2/2018 | Lewis | ............... | G06F 16/24578 |
| 2018/0253428 A1* | 9/2018 | Jacobson | ................ | G06F 16/43 |
| 2019/0130185 A1* | 5/2019 | Delaney | ................ | G06F 16/739 |
| 2019/0342242 A1* | 11/2019 | Paul | ........................ | H04L 51/32 |

* cited by examiner

AUTOMATED RANKING OF VIDEO CLIPS

TECHNICAL FIELD

The present disclosure relates generally to video processing systems and more particularly to video identification systems.

BACKGROUND

Consumption of content on mobile devices continues to grow. With the vast amount of content available for consumers to access, there is an ever increasing need to identify for the consumers the best content to consume. One typical way to identify such content for consumers is based on popularity of the content. Popularity of the content, though, can be determined using many different factors and often does not accurately reflect actual quality.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
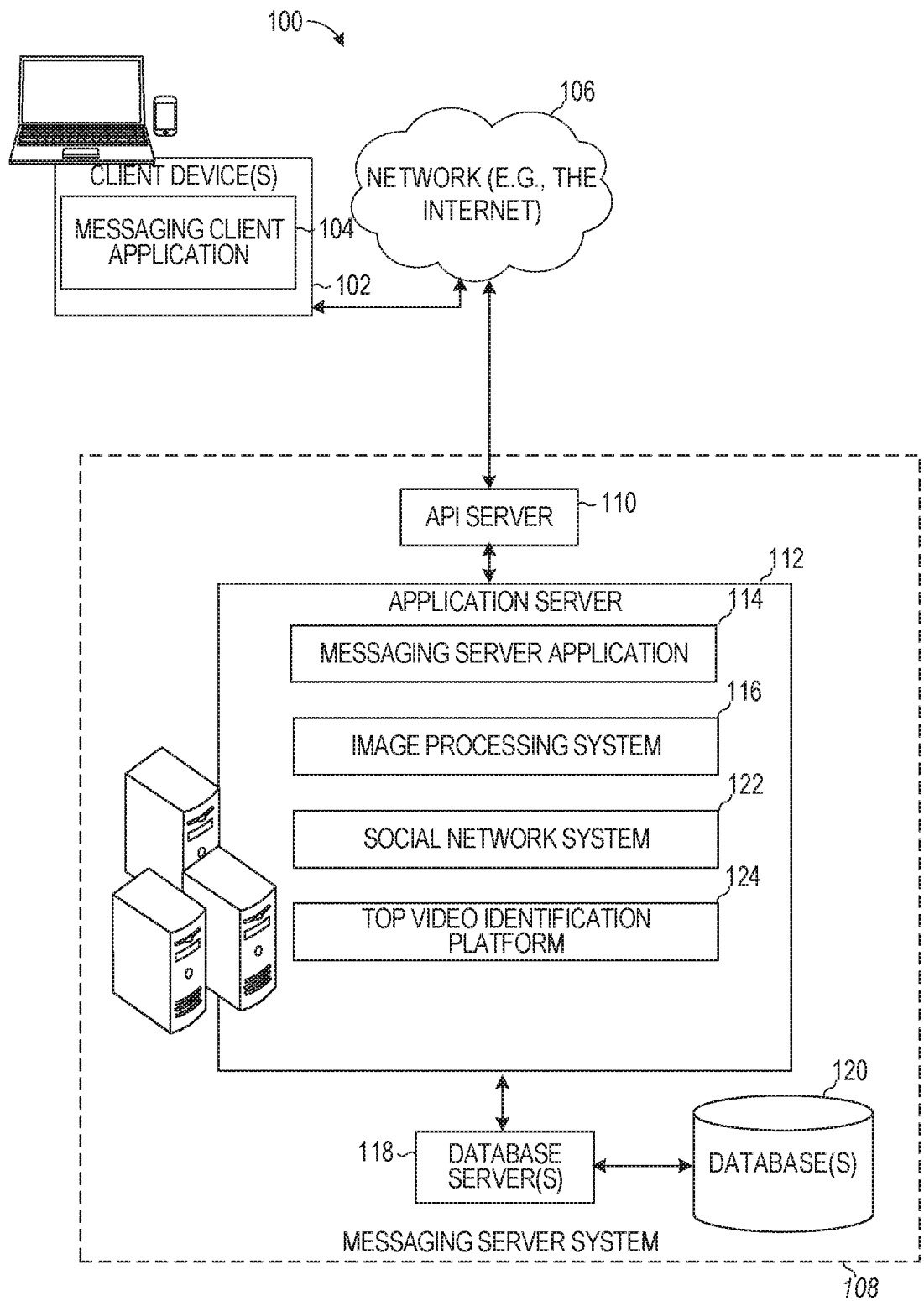
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

One of the challenges of finding the best content to present to consumers to view is choosing how to rank the videos based on a number of factors. Typical systems rank videos by considering popularity of the videos and a particular profile of a user. For example, the typical systems first identify which videos have the greatest number of views among a population. Then, within the videos with the greatest number of views, a set of videos are selected for presentation to a consumer based on how well those videos match a profile of the consumer. While this approach works well in presenting to a user videos that are generally popular and may be of interest to the user, a great number of videos that may also be of interest to the user but that have not been viewed by a significant number of users are excluded.

Such videos that may also be of interest may be created by users who do not have a large following on a social network and so can never reach the level of being popular among a significant number of users. To find these videos, a user has to search through many videos submitted by the user's social network or that have been viewed by the user's friends on the social network. This process is very inefficient, requires navigation through many pages of content, and can take a great deal of time and may still end up missing the video that may be of interest to the user. This leaves the user with having to navigate many more screens to find a video they are looking for, resulting in a poor user experience and reduced efficiency.

The disclosed embodiments improve the efficiency of using the electronic device by providing a top video identification platform that identifies top videos that are of potential interest to users based on various factors that include interactions of the creator of the video and the consumers of the video. By taking into account interactions performed by the creator of the video, the system is able to identify particular videos that may be of interest based on how the videos were initially created. Then, among those videos, the systems consider interactions performed by the video consumers, including normalized popularity among other actions, to further rank and identify videos that may be of interest as candidate top videos. These top videos can then be further ranked by curators to hand pick the top videos to include in a list of top videos to be presented to various users.

By considering many factors, including interactions performed by the creator and the consumer of the videos, and by curating which videos are included in a top videos list, the disclosed systems identify top videos that may be of interest to users without limiting the identification based on popularity of the videos. This significantly improves how users browse through videos to find videos that are of interest to the users. Particularly, this significantly improves the user experience, reduces the number of steps a user has to perform to find a video of interest, and makes viewing videos more enjoyable. This is because the user can find a video of interest without actually searching for and opening up different interfaces to find the video. Rather than paging through multiple screens of videos and menus to find a video of interest, only a few steps may be needed from a top video list interface to reach and view a video of interest.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

Each messaging client application 104 is also able to communicate with top video identification platform 124. Top video identification platform 124 receives videos from each messaging client application 104, identifies top videos among the videos it receives from the client applications 104, and presents the list of top videos to the client applications 104. For example, the messaging client application 104 generates a set of data representing interactions performed by a creator and consumer of a video. This data can be generated before, during, or after the video is created and the data is sent to the top video identification platform 124. The top video identification platform 124 analyzes content of the videos that were submitted and computes a score for each video using the creator and consumer interaction data. The video identification platform 124 ranks a set of the videos based on their assigned scores and selects a subset of the videos to be included in a top videos list to be presented to a plurality of users.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and top video identification platform 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by top video identification platform 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users or videos of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
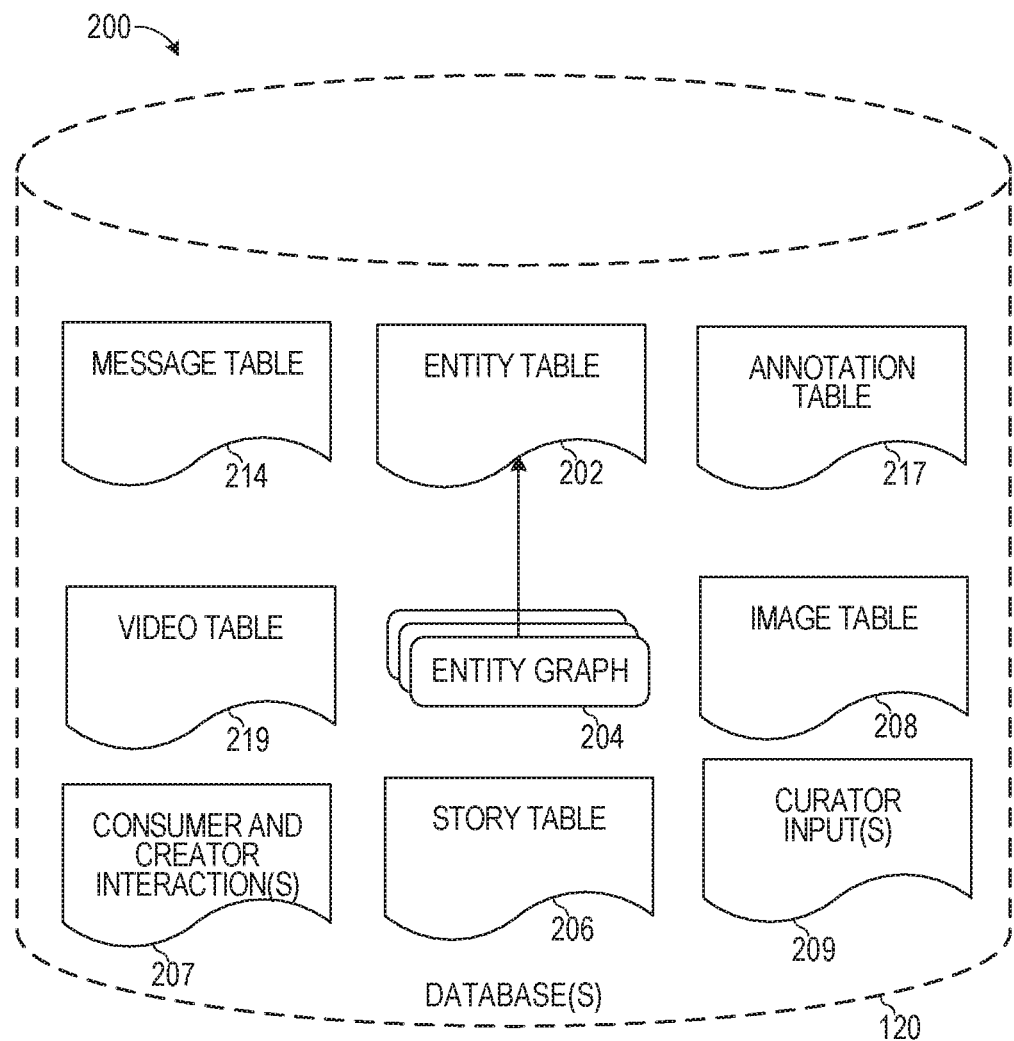
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 217. Database 120 also stores annotated content received in the annotation table 217. Filters for which data is stored within the annotation table 217 are associated with and applied to videos (for which data is stored in a video table 219) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 215 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 217 with various images and videos stored in the image table 208 and the video table 215. This may be done by storing unique video identifiers with the various annotations to identify the video associated with the annotations.

Consumer and creator interaction(s) 207 stores data representing creator and consumer interactions associated with various videos of the top video identification platform 124. Consumer and creator interaction(s) 207 provides the interaction data used by the top video identification platform 124 to identify candidate videos for a top videos list. For example, consumer and creator interaction(s) 207 stores first data representing creator interactions including information indicating at least one of whether the creator used a front facing or rear facing camera of a user device to create the first video, whether the creator enhanced the first video using a zoom or a speed effect, or whether the creator added a filter, a lens, an object, a caption, an emoji, or a sticker to the first video. For example, consumer and creator interaction(s) 207 stores second data representing the consumer interactions including information indicating at least one of an amount of time the first video has been viewed by a plurality of users including the consumer, whether the first video was shared between a threshold number of the plurality of users, or whether one of the plurality of users captured a screenshot of the first video.

Curator input(s) 209 stores data representing approval status (e.g., curator rankings and/or approvals) associated with various candidate videos of the top video identification platform 124. Specifically, curator input(s) 209 stores an indication of whether a given video has been approved by a primary curator and whether the given video was approved by a secondary curator. Each of the curator input(s) 209 data is associated with the unique identifier of the video corresponding to the approval status. Curator input(s) 209 provides the curator data used by the top video identification platform 124 to add videos to the top videos list that is presented to a plurality of users.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
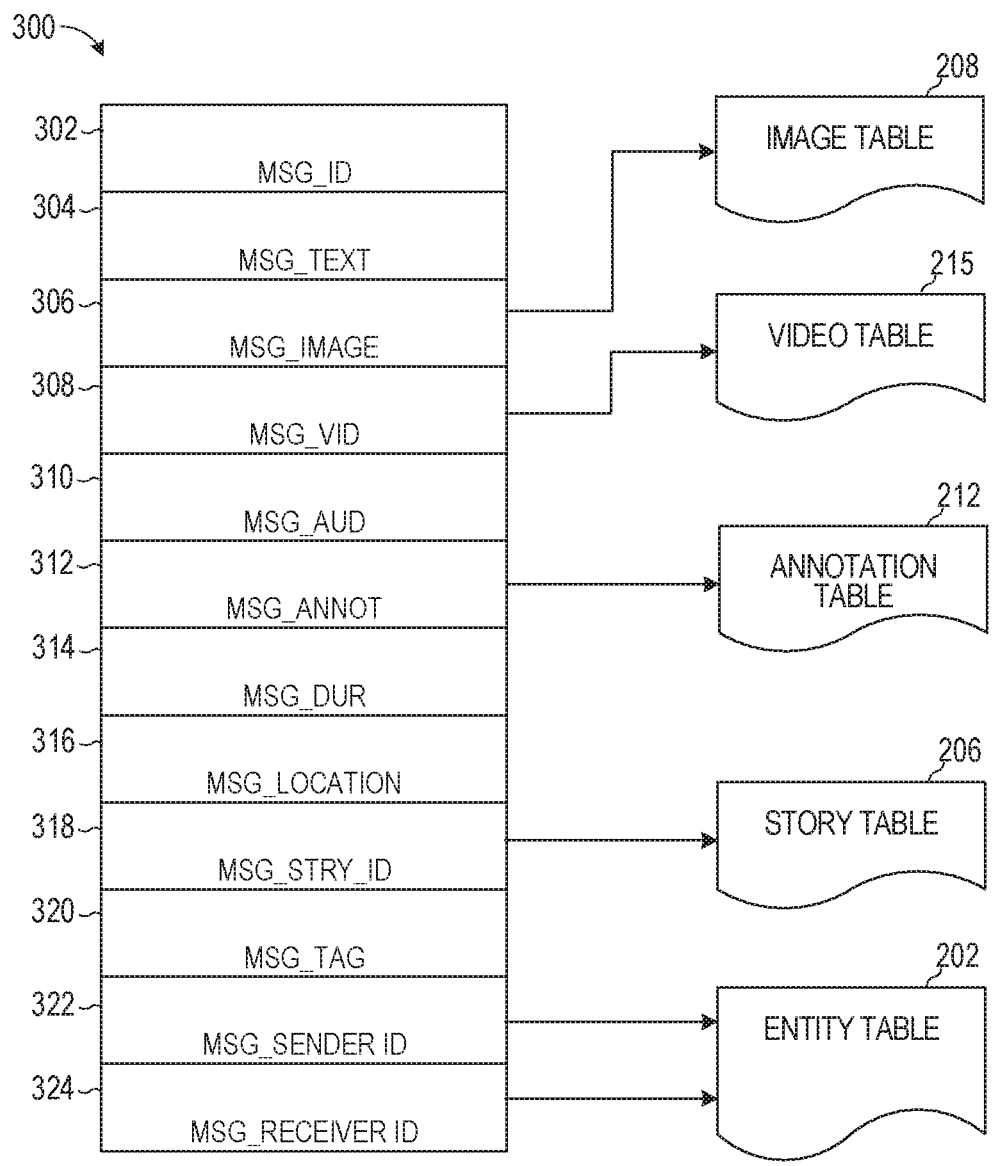
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- A message annotation 312: annotation data (e.g., filters, objects, captions, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 215, values stored within the message annotations 312 may point to data stored in an annotation table 217, values stored within the message story identifier 318 may point to data stored in a story table 206, and values stored within the message sender identifier 322 and the message receiver identifier 324 may point to user records stored within an entity table 202.

Figure 4:
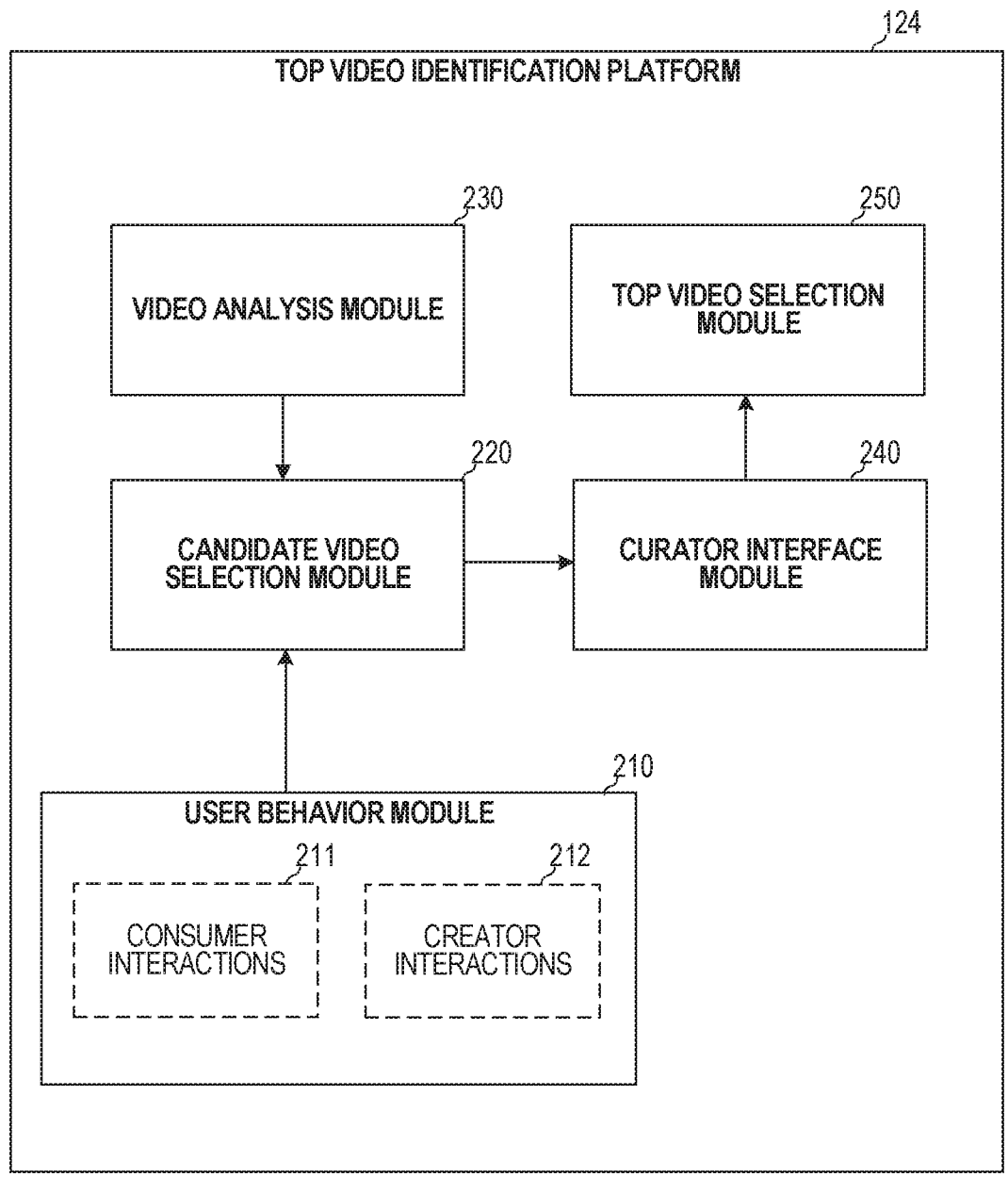
FIG. 4 is a block diagram showing an example top video identification platform, according to example embodiments.

FIG. 4 is a block diagram showing an example top video identification platform 124, according to example embodiments. Top video identification platform 124 includes a user behavior module 210, a candidate video selection module 220, a video analysis module 230, a curator interface module 240, and a top video selection module 250.

The candidate video selection module 220 communicates with the user behavior module 210 to obtain data, which may include scores representing consumer and creator interactions with one or more videos. The candidate video selection module 220 also communicates with the video analysis module 230 to obtain one or more labels associated with the videos. The candidate video selection module 220 generates a score for each of the videos based on the labels and the consumer and creator interaction data and based on gating factors (e.g., whether the videos are longer than a specified duration, whether the videos have been viewed by a certain number of users, whether the videos were submitted by a user who has more than a threshold number of followers, whether the video was submitted by an unauthorized user, whether the video has content that exceeds a parental rating, whether the video was submitted by a user who is less than a certain age or is within an age range (such as 13-17), and/or whether the video was submitted from a location that is within a given distance to a school or other facility). The candidate video selection module 220 identifies the videos with scores that exceed a given threshold and pass the gating factors and provides this subset of videos to the curator interface module 240. The curator interface module 240 receives approval from one or more curators of a given subset of the videos and provides this subset to the top video selection module 250 for presentation to a plurality of users.

For example, the user behavior module 210 receives creator interactions 212 from a user who creates a video by communicating with the messaging client application 104 of the creator. These creator interactions 212 may be received from consumer and creator interaction(s) 207. The messaging client application 104 receives a first user input to activate the camera of a user device being used to capture a video. The messaging client application 104 then receives a second user input selecting between a front facing camera and a rear facing camera of the user device. The front facing camera may be a camera on a screen of the user device pointing towards the user and is typically used to capture a selfie or self-image of the user. The rear facing camera may be a camera on the back of the user device and points in the opposite direction of the front facing camera. The messaging client application 104 determines whether the user selects the front or rear facing camera to capture a video. After the user creates the video, the messaging client application 104 associates interaction data with the video indicating which of the front or rear facing camera was used to capture the video. The messaging client application 104 transmits this data together with the captured video to user behavior module 210 of the top video identification platform 124.

As another example, after the user creates the video or during creation of the video, the user modifies or enhances the video in various ways. For example, while creating the video or after the video is created, the user modifies or enhances the video by zooming into a portion of the content that is/was being captured and/or selecting an option to slow down or speed up the frame rate of a portion of the video being captured. As another example, after or during creation of the video, the creator adds annotations such as a filter, a lens, an object, a caption, an emoji, or a sticker to the video. The messaging client application 104 tracks these interactions and associates them with the video that is captured for transmission together with the video to the user behavior module 210 of the top video identification platform 124. The top video identification platform 124 assigns a unique video identifier to the received video and stores the data representing the creator interactions in a database. The data representing the interactions is assigned the same unique video identifier to associate the data with the received video.

The top video identification platform 124 receives videos from a variety of sources and devices. For example, the top video identification platform 124 can receive videos from a client device 102 that includes augmented reality googles, electronic glasses, or other headwear. The top video identification platform 124 can receive videos from a client device 102 that includes a computer or mobile phone. The top video identification platform 124 can receive videos that are created and modified using filters.

Initially, videos that are received by the top video identification platform 124 are presented to a subset of users (e.g., friends of the user who created the video) and/or are included in a general list of videos that can be accessed by a plurality of users of the messaging system. Consumer interactions data 211 is collected by the user behavior module 210 for a specified period of time in association with each of the videos that is received. Such consumer interaction data 211 may be received from consumer and creator interaction(s) 207 and includes data indicating an amount of time each video has been viewed by a plurality of users, whether the video was shared between a threshold number of the plurality of users, and/or whether one of the plurality of users captured a screenshot of the video.

For example, the user behavior module 210 aggregates the total watch time of each video representing an amount of time the video has been viewed by a plurality of users and normalizing the aggregated total watch time value. By normalizing the total watch time, any video, regardless of its popularity or number of followers, can be considered as a candidate for the top video list. Specifically, simply adding up the watch time across all of the users may not be sufficient because videos from users with a lot of followers or friends may end up dominating the pool of videos selected as candidates for the top video list. Normalizing the total watch time gives each video an equal chance of being selected as a candidate by offsetting the total watch time based on the number of followers the video or video creator has. For example, the score generated based on the total watch time can be computed in accordance with total watch time score=(total watch time)/(video duration*number of followers), where the video duration represents the length of the video under consideration and the number of followers represents the number of users who selected an option to follow the video on the social network and/or the number of followers the creator of the video has. This normalized watch time is included in the data representing interactions of the consumers and is assigned the unique identifier of the video.

The user behavior module 210 tracks each time a given video is shared between users on the social network. For example, a user before or after viewing the video selects an option to share or send the video to a friend of the user on the social network. In response to determining that the user selected the share option, a value representing the number of times the video was shared can be accumulated or incremented. After this number reaches a threshold amount, a score associated with the video may be increased.

The user behavior module 210 tracks each time a screenshot is taken of a given video by a user on the social network. For example, a user selects a screenshot option while viewing the video to capture and store an image of a frame of the video being presented. In response to determining that the user selected the screenshot option, a value representing the number of times screenshots of the video were taken can be accumulated or incremented. After this number reaches a threshold amount, a score associated with the video may be increased.

In an embodiment, the user behavior module 210 computes the consumer interaction score for a given video by aggregating weighted values of the consumer interaction criteria (e.g., the total watch time score, the number of times the video was shared, and the number of screenshots of the video that were taken). For example, a first weight is assigned to the total watch time score, a second weight is assigned to the number of times the video was shared, and a third weight is assigned to the number of screenshots of the video that were taken. The weights may be different for each criterion. The user behavior module 210 computes the consumer interaction score for the given video by multiplying the weights with their respective consumer interaction criterion (e.g., the total watch time score, the number of times the video was shared, and the number of screenshots of the video that were taken) and summing the total value.

After the videos have been consumed by a certain number of users and/or after a sufficient amount of consumer tracking information has been collected, the creator and consumer interaction data associated with the videos are analyzed by the user behavior module 210 to determine whether the videos qualify to be considered for presentation in a top video list and provided to the candidate video selection module 220. These videos are candidate videos and are assigned a score based on the creator and consumer interaction data. Subsets of the candidate videos are presented in a list to one or more curators for further ranking. Candidate videos that are approved by the one or more curators are added to the top video list for presentation to a plurality of users. Namely, the videos that are added to the top video list are added to a specific region or menu of the messaging client application 104 that only presents or is dedicated to presenting videos that are in the top video list.

In some cases, the client device 102 communicates with the user behavior module 210 via a dedicated dumb terminal that has software with minimal communication and display capabilities. In such cases, the client device 102 communicates directly with the user behavior module 210 via the API content. In some cases, the client device 102 communicates with the user behavior module 210 via a website. In such cases, the client device 102 communicates with the user behavior module 210 via a web client module.

Video analysis module 230 analyzes frames of each video and assigns a label to the video that describes the content of the video. In an implementation, the video analysis module 230 analyzes frames of only those videos that exceed a score threshold that have been identified by the user behavior module 210. In another implementation, the video analysis module 230 analyzes frames of all the videos received by the top video identification platform 124. The video analysis module 230 performs image recognition of content shown in one or more frames of a given video. The video analysis module 230 retrieves a label associated with the recognized images and assigns the label to the video. For example, a video of a person skateboarding is analyzed to recognize a skateboard that appears in a series of consecutive frames. In this case, the video analysis module 230 retrieves a skateboard label and associates the label with the video. In another example, a video of an acrobatics scene may depict various objects that are found in a gym in a set of consecutive frames (e.g., a balance beam and a swing). In this case, the video analysis module 230 assigns an acrobatics label to the video. The video analysis module 230 may retrieve scores associated with each label that represent how interesting each label is. Such scores can vary dynamically over time as different labels may be found to be interesting at different times. The video analysis module 230 computes a score for the labeled video based on the retrieved scores of the label that is assigned to the video. In some implementations, the video analysis module 230 assigns a confidence score to the label that is assigned. This confidence score represents a level of accuracy of the label that has been automatically assigned to the video. In such cases, the overall score computed for the video by the video analysis module 230 may be a weighted factor of the label score and the confidence score.

The video analysis module 230 may also analyze caption information associated with each video. The video analysis module 230 may exclude or assign a very low score to videos that include only images, only text, or only text and images. The video analysis module 230 may include or assign a very high score to videos that include text (e.g., text that is less than a specified number of characters and/or text that includes words of excitement such as lmao, lolol, OMG, tears, and so forth) and emojis or avatars (e.g., tears with joy emojis) as the annotation associated with the video. This is because videos with only emojis as captions require context to understand and so are not good candidates for a top videos list. Videos from students in schools or colleges require context that is very local to the school or college and are not good candidates for the top videos list which is not geographic centric. Images are almost always boring and not interesting to users and videos with long captions are not that entertaining. Video analysis module 230 also retrieves a geotag representing a geographical location associated with a given video. The score computed by the video analysis module 230 may also be a factor of a score associated with the geotag.

The candidate video selection module 220 aggregates the scores of the videos generated based on the captions, labels, and creator and consumer interactions. The scores may be aggregated in a weighted manner such that the score generated based on the captions and labels affects the overall video score less than the score generated based on the creator and consumer interactions. Particularly, weights may be assigned to the captions, labels, and creator and consumer interaction scores. The weights may be different. The candidate video selection module 220 multiplies the scores of the videos received from the video analysis module 230 by the corresponding weight and multiplies the scores of the videos received from the user behavior module 210 by the corresponding weight and then sums the weighted scores together to compute an overall score for each video. The candidate video selection module 220 identifies those videos in the candidate video list that have a score that exceeds a specified value. These videos form a subset of videos that is provided to the curator interface module 240.

The curator interface module 240 presents a screen to a curator for choosing videos to include in a top videos list. An illustrative screen provided by the curator interface module 240 is discussed below in connection with FIG. 7. The screen includes a collection of the videos in the subset that is provided by the candidate video selection module 220. A first curator selects a given video in the screen and assigns an approval status (e.g., like it or love it or not approved) to the video. Those videos that have an approval status of like it or love it are presented to a second curator. The second curator approves a subset of those videos for inclusion in a top videos list. The top videos list is provided to the top video selection module 250. The top video selection module 250 randomly or pseudo-randomly or based on a rank presents the videos that are in the top videos list to the plurality of users of the messaging server system 108. An illustrative screen provided by the top video selection module 250 is discussed below in connection with FIG. 8.

Figure 5:
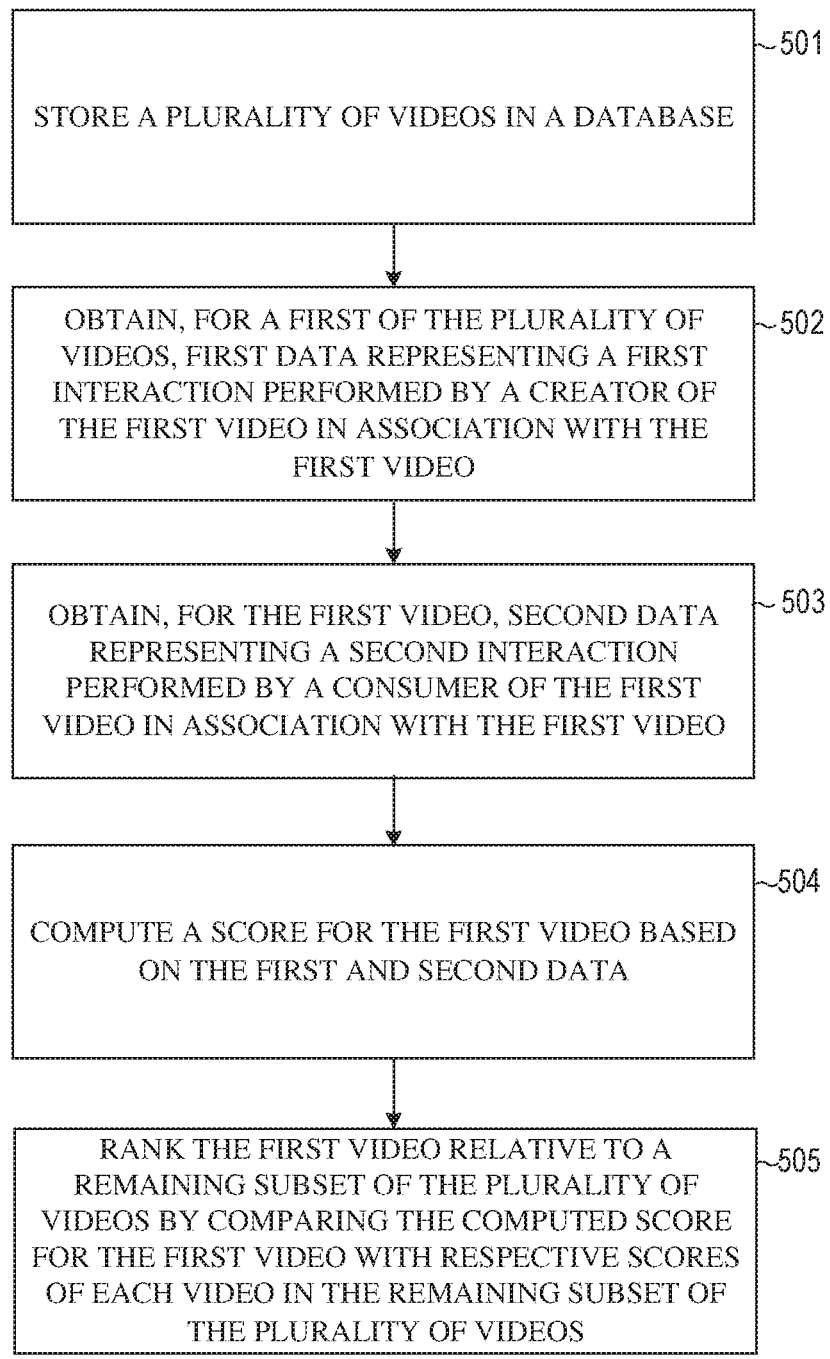
FIGS. 5-6 are flowcharts illustrating example operations of the top video identification platform, according to example embodiments.
Figure 6:
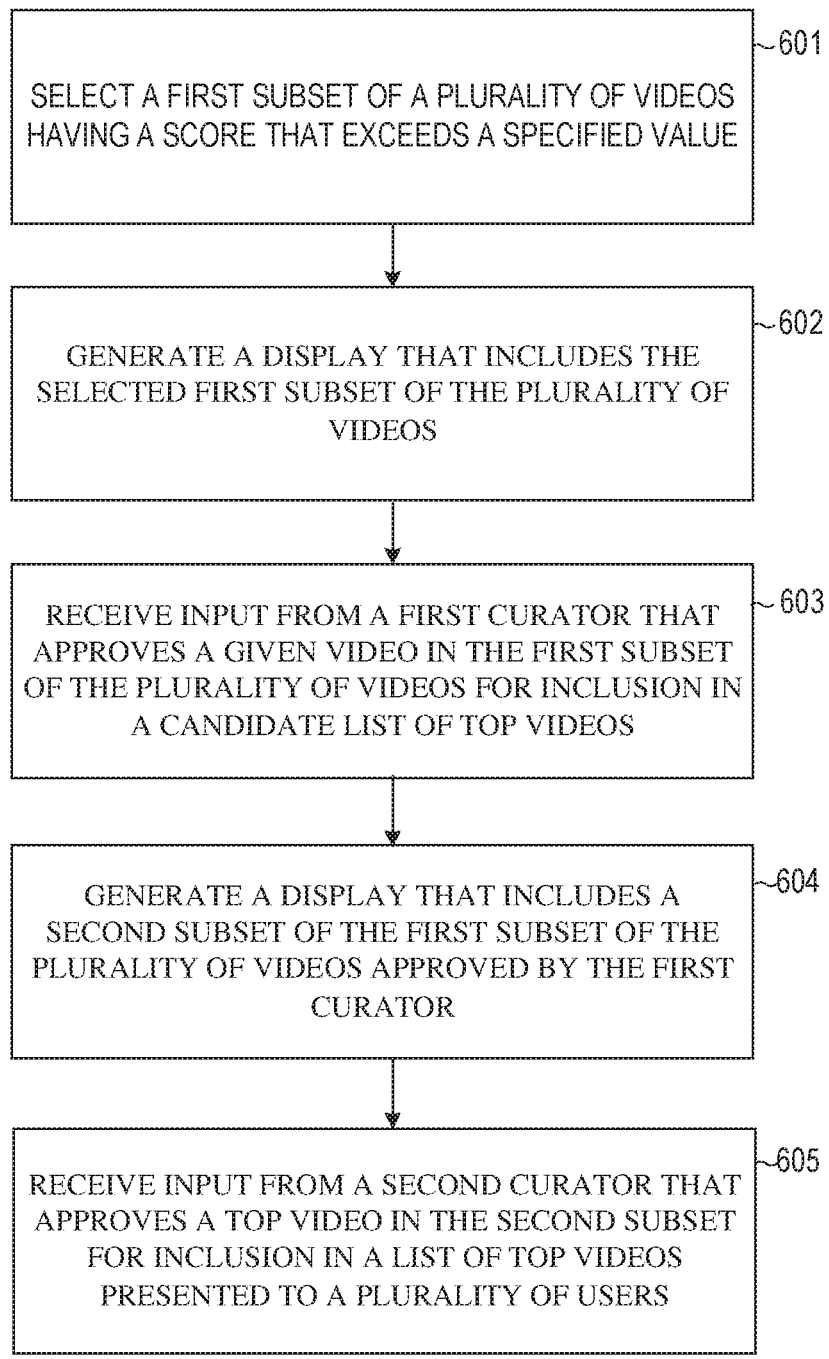

FIGS. 5-6 are flowcharts illustrating example operations of the top video identification platform 124 in performing processes 500-600, according to example embodiments. The processes 500-600 may be embodied in computer-readable instructions for execution by one or more processors such that the operations of the processes 500-600 may be performed in part or in whole by the functional components of the messaging server system 108; accordingly, the processes 500-600 are described below by way of example with reference thereto. However, in other embodiments at least some of the operations of the processes 500-600 may be deployed on various other hardware configurations. The processes 500-600 are therefore not intended to be limited to the messaging server system 108 and can be implemented in whole, or in part, by any other component.

At operation 501, the top video identification platform 124 stores a plurality of videos in a database. For example, the top video identification platform 124 receives a video from a creator at a client device 102 and stores the received video in a database 120.

At operation 502, the top video identification platform 124 obtains, for a first of the plurality of videos, first data representing a first interaction performed by a creator of the first video in association with the first video. For example, user behavior module 210 obtains creator interaction data 212 from the consumer and creator interactions(s) 207 data representing a first interaction performed by a creator of the first video in association with the first video. The first data may be creation/origination data representing an originator/creator interaction.

At operation 503, the top video identification platform 124 obtains, for the first video, second data representing a second interaction performed by a consumer of the first video in association with the first video. For example, user behavior module 210 obtains consumer interaction data 211 from the consumer and creator interactions(s) 207 data representing a second interaction performed by a consumer of the first video in association with the first video. The second data may be consumption/consumer action data representing a consumer interaction.

At operation 504, the top video identification platform 124 computes a score for the first video based on the first and second data. For example, the user behavior module 210 computes a score for the video by weighting the consumer and creator interactions data 211 and 212.

At operation 505, the top video identification platform 124 ranks the first video relative to a remaining subset of the plurality of videos by comparing the computed score for the first video with respective scores of each video in the remaining subset of the plurality of videos. For example, the candidate video selection module 220 obtains the ranks that were generated by the user behavior module 210 and computes an overall rank for the first video based on additional scores provided by the video analysis module 230 and generates a subset of videos that have a score that exceeds a specified value. This subset is then provided to the curator interface module 240 for ultimately being included in a top videos list presented to users by the top video selection module 250.

Process 600 describes operations performed by the curator interface module 240 to identify which videos are approved for inclusion in the top videos list presented to users by the top video selection module 250. At operation 601, the top video identification platform 124 selects a first subset of a plurality of videos having a score that exceeds a specified value. For example, the candidate video selection module 220, after computing the scores for all of the videos based on the creator and consumer interaction data and based on the caption and/or labels provided by the video analysis module 230, identifies those videos that have a score that exceeds a specified value.

At operation 602, the top video identification platform 124 generates a display that includes the selected first subset of the plurality of videos. For example, the curator interface module 240 presents screen 700 (FIG. 7) to enable one or more curators to further rank and/or approve selected videos for inclusion in a top videos list.

At operation 603, the top video identification platform 124 receives input from a first curator that approves a given video in the first subset of the plurality of videos for inclusion in a candidate list of top videos. For example, the curator interface module 240 receives a selection from a curator of a given video that is presented in the interface. In response, the curator interface module 240 presents the video to the curator in full screen with options indicating a level of like or dislike for the video. For example, the options may include a like it option that assigns a first rank to the video and a love it option that assigns a higher second rank to the video. If no options are selected by the curator, the video is unranked and may not selected for inclusion in the top videos list or is assigned a low curator score.

At operation 604, the top video identification platform 124 generates a display that includes a second subset of the first subset of the plurality of videos approved by the first curator. For example, the curator interface module 240 identifies those videos that have an overall curator rank that exceeds a specified value. For example, the curator interface module 240 aggregates the scores determined by the number of curators that selected a like it option for the video, the number of curators that selected a love it option, and the number of curators that did not select a curator ranking option. Specifically, the like it option may be associated with a score of 5 and the love it option may be associated with a score of 10. If, for a given video provided by the candidate video selection module 220 to the curator interface module 240, three curators selected the like it option and two curators selected the love it option, the curator interface module 240 may compute an overall curator score of 35 based on the number of curators multiplied by the selected score assigned by each curator (e.g., 3*5+2*10).

At operation 605, the top video identification platform 124 receives input from a second curator that approves a top video in the second subset for inclusion in a list of top videos presented to a plurality of users. The curator interface module 240 identifies a subset of videos that have a curator score that exceeds a specified value and presents those videos to a second curator for a second level of approval. A similar screen is presented to the second curator who can select a given video and is given an option to approve the video for inclusion in the top videos list. Any video selected in the second level of approval for inclusion in the top videos list is provided to the top video selection module 250 for distribution to a plurality of users by being included in a list of top videos. As referred to herein, first curator refers to a curator that approves or assigns a ranking to a given video in a primary level of review and a second curator refers to a curator that approves a given video that has already been ranked or approved by the first curator in a second level of review. Approvals made by the second curator result in the given video being included in the list of top videos provided to a plurality of users.

Figure 7:
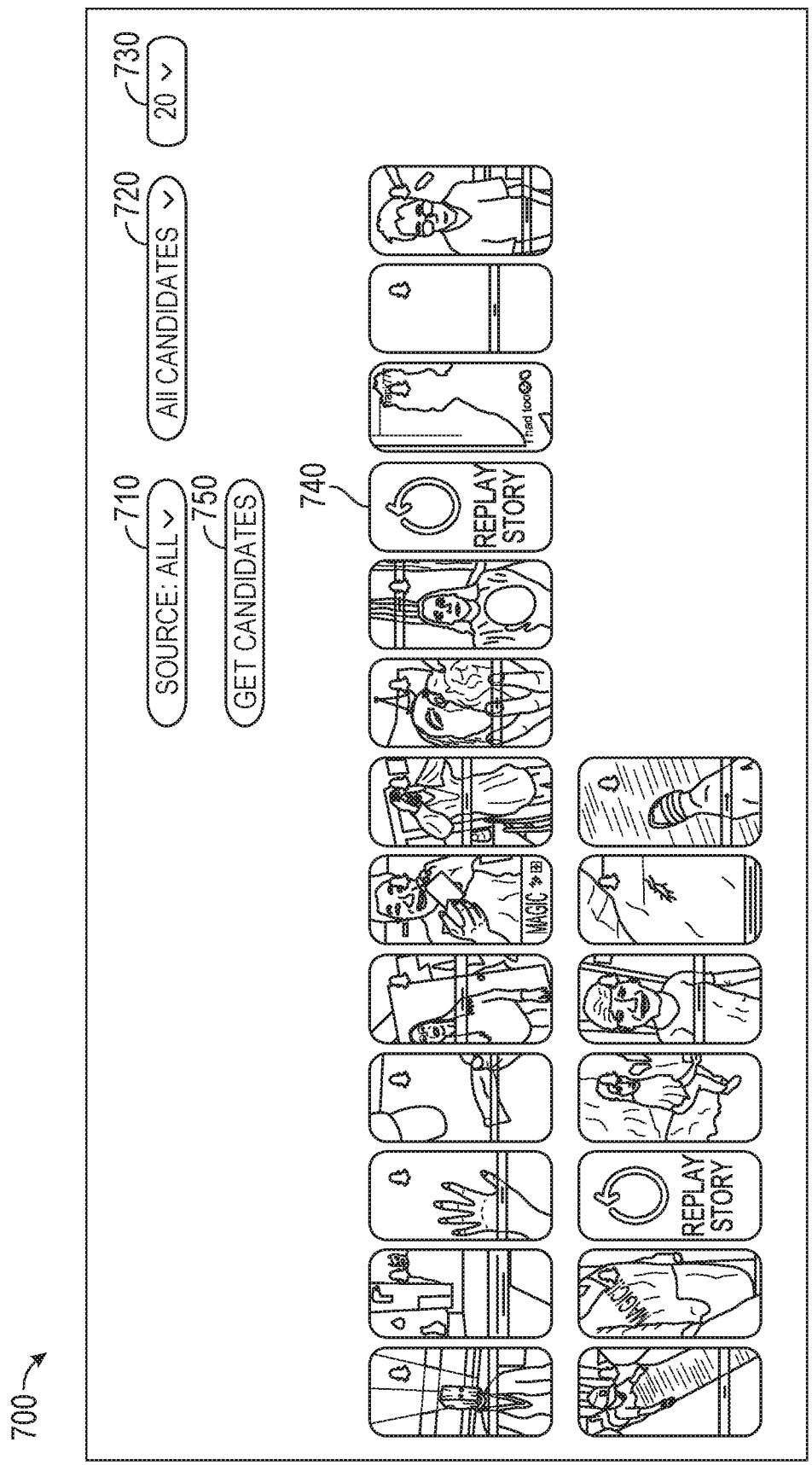
FIGS. 7-8 are illustrative user interfaces of the top video identification platform, according to example embodiments.

FIG. 7 is illustrative user interface screen 700 of the top video identification platform 124, according to example embodiments. Screen 700 presents a list of videos provided by the candidate video selection module 220. This list is presented to a first curator. When the initial screen 700 loads, each of the videos shown plays simultaneously from a starting position to the ending position. When a given video reaches the ending position, a replay option 740 is presented in place of a frame of the given video. In response to receiving a selection from the curator of the replay option 740, the corresponding video starts playing again from the starting position to the ending position.

Each video shown in screen 700 is selectable. In response to receiving a selection from the first curator of a given video, the screen 700 retrieves the video and presents the video in full screen. Together with the video in full screen, screen 700 also includes a set of ranking options, such as a like it option and a love it option. In response to receiving a user selection of the like it option or love it option, the curator interface module 240 retrieves the score associated with the selected option and accumulates the score with a running curator score associated with the video. The video exits the full screen mode and the plurality of videos are presented in the list shown in screen 700 again.

Screen 700 includes a source option 710. The source option 710 allows the first curator to filter the set of videos that are shown in the screen 700 based on one or more criteria. For example, in response to receiving a user selection of the source option 710, a list of criteria is presented to the first curator. The list of criteria includes any one or more of the basis used to score the video. For example, the list of criteria includes one or more creator interaction options, consumer interaction options, label options, and caption options. The first curator can select to include or exclude videos from screen 700 by selecting or deselecting one or more of the options listed in the list of criteria. For example, if the label option is deselected, the list of videos shown in screen 700 may be reranked by reducing or removing from their overall scores any value attributed to the label score.

Screen 700 includes a candidate types option 720. The candidate types option 720 allows the first curator to filter the list of videos in screen 700 based on their currently assigned approval status. For example, in response to receiving a user selection of the candidate types option 720, the first curator can select an option to exclude from screen 700 any video that has already received a score in the primary approval level from one or more other first curators. The first curator can similarly exclude based on candidate types option 720 any video that is currently in second level of approval or that has already been approved by a second curator for inclusion in a list of top videos. The first curator can similarly only include videos that have not been reviewed by another first curator or second curator in a primary or secondary level of approval using the candidate types option 720.

A number of videos option 730 is included in screen 700. Selection of option 730 enables a curator to limit the total number of videos that are presented in a given page view of screen 700. In an embodiment, the videos shown simultaneously in a given page view may be scaled up or down to fit the screen together based on the total number selected in option 730.

After making the selections for videos to include and exclude using options 710, 720, and 730, a get candidates option 750 can be selected to update the list of videos shown in screen 700. A next and previous page option (not shown) may be included to enable the first curator to load additional or previous pages of videos for ranking or approval.

A second curator can be presented with a similar screen 700. The second curator can select a given video from the list to approve the video for inclusion in the list of top videos that are presented to the plurality of users.

Figure 8:
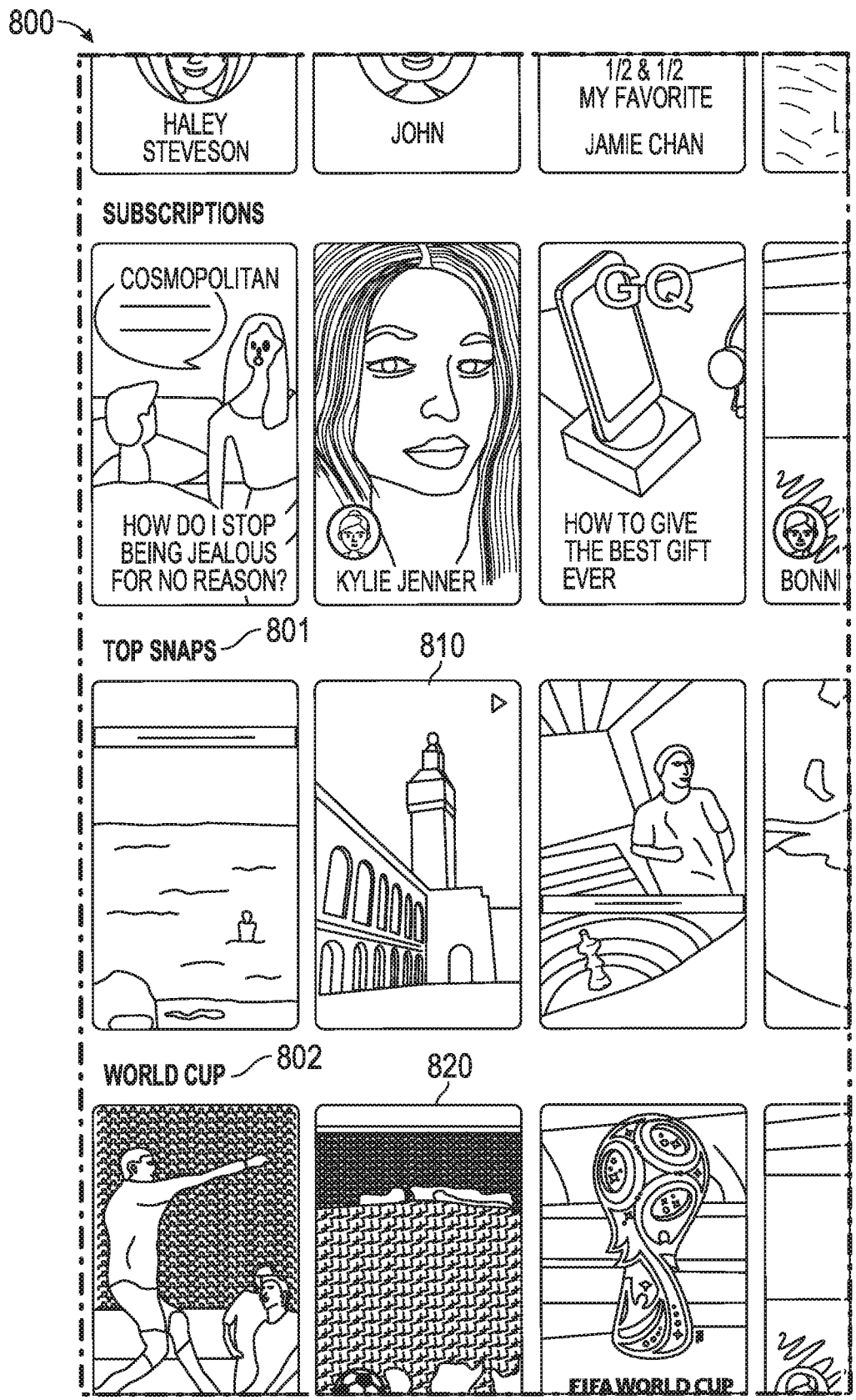

FIG. 8 is illustrative user interface screen 800 of the top video identification platform 124, according to example embodiments. Screen 800 is presented to a plurality of users on respective client devices 102. The screen 800 includes a top snaps region 801 in which the list of top videos is presented. The screen 800 includes a world cup region 802 as well as one or more other regions in which other videos that are not in the list of top videos are presented. The regions 801 and 802 are presented together but may also be presented individually. For example, in response to receiving a user selection of the top snaps region 801, the screen may exclusively display a list of the top videos. Options to reach the exclusive list of top videos may similarly be provided as separate menu items in other interface screens. For example, a dedicated top videos list option may be provided on a main screen of the messaging client application 104. In response to receiving a user selection of the dedicated top videos list option, the list of top videos may be presented. The list of top videos can be organized, sorted, and filtered based on the source, user, type of content, or type of client device 102 used to create the corresponding videos.

In an embodiment, each video shown in the top snaps region 801 may be represented as a thumbnail together with videos in other regions such as the world cup region 802. For example, the top snaps region 801 includes a first thumbnail 810 and the world cup region includes a second thumbnail 820. In some implementations, each thumbnail of the top snaps region 801 presents the corresponding video as a low frame rate video in the thumbnail. This low frame rate video may loop when the video reaches the ending position or may present a single static frame when the low frame rate video reaches the ending position. Each thumbnail of the world cup region 802 presents only a single static frame or image corresponding to the video associated with the thumbnail. In response to receiving a user selection of the thumbnail 810, the video corresponding to the selected thumbnail is presented in full screen.

In an embodiment, videos selected from other regions, such as world cup region 802, may cause the consumer interaction data tracked by the user behavior module 210 to be updated. The top video identification platform 124 continuously monitors the interaction data associated with the videos selected from the other regions to update their respective scores. Such videos may end up being included in the top snaps region 801 once their respective score and approval status reach a certain level.

Figure 9:
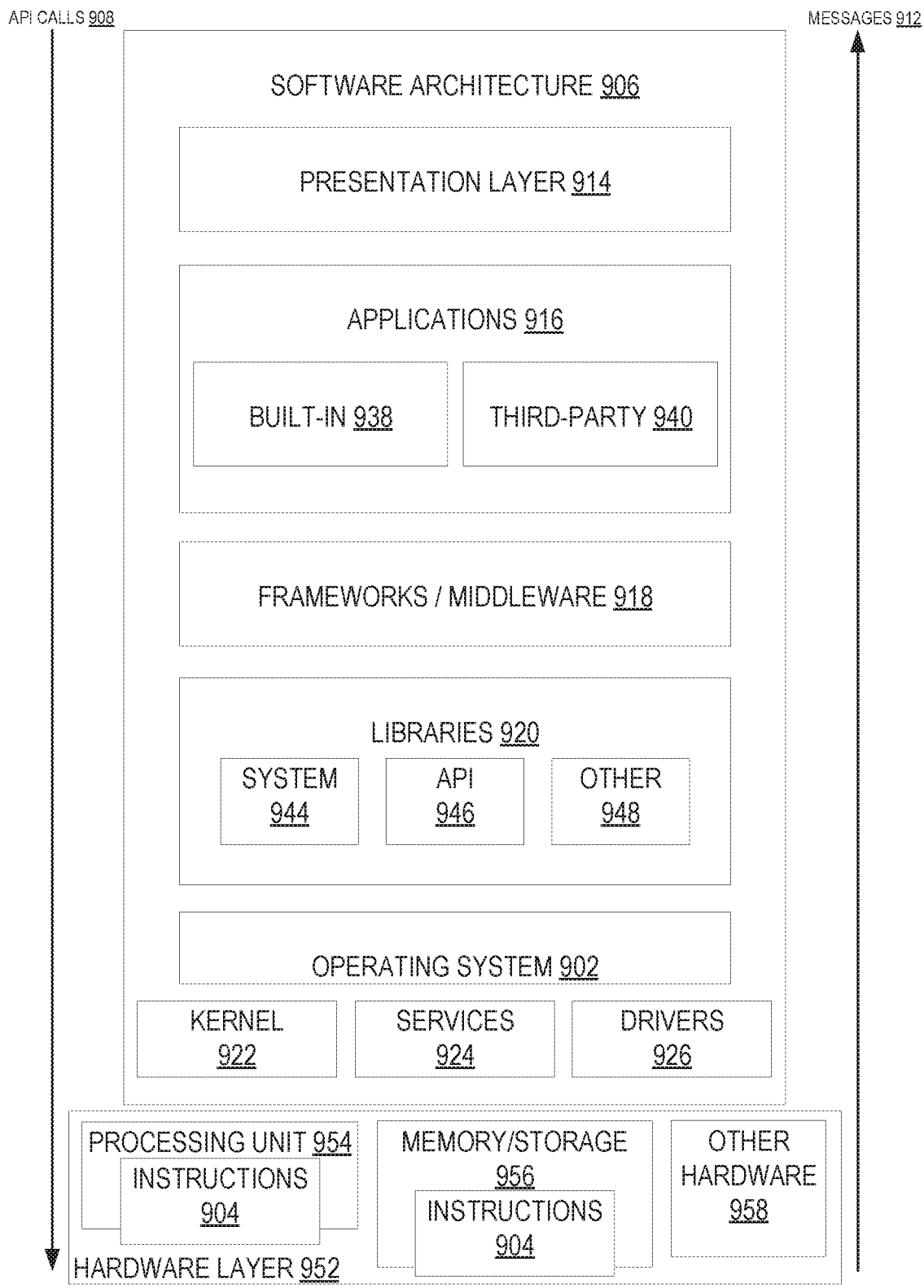
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems 902 may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4. H.264, MP3, AAC, AMR, JPG, PNG), graphics libraries (e.g., an OpenGL framework that may be used to render two-dimensional and three-dimensional media in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
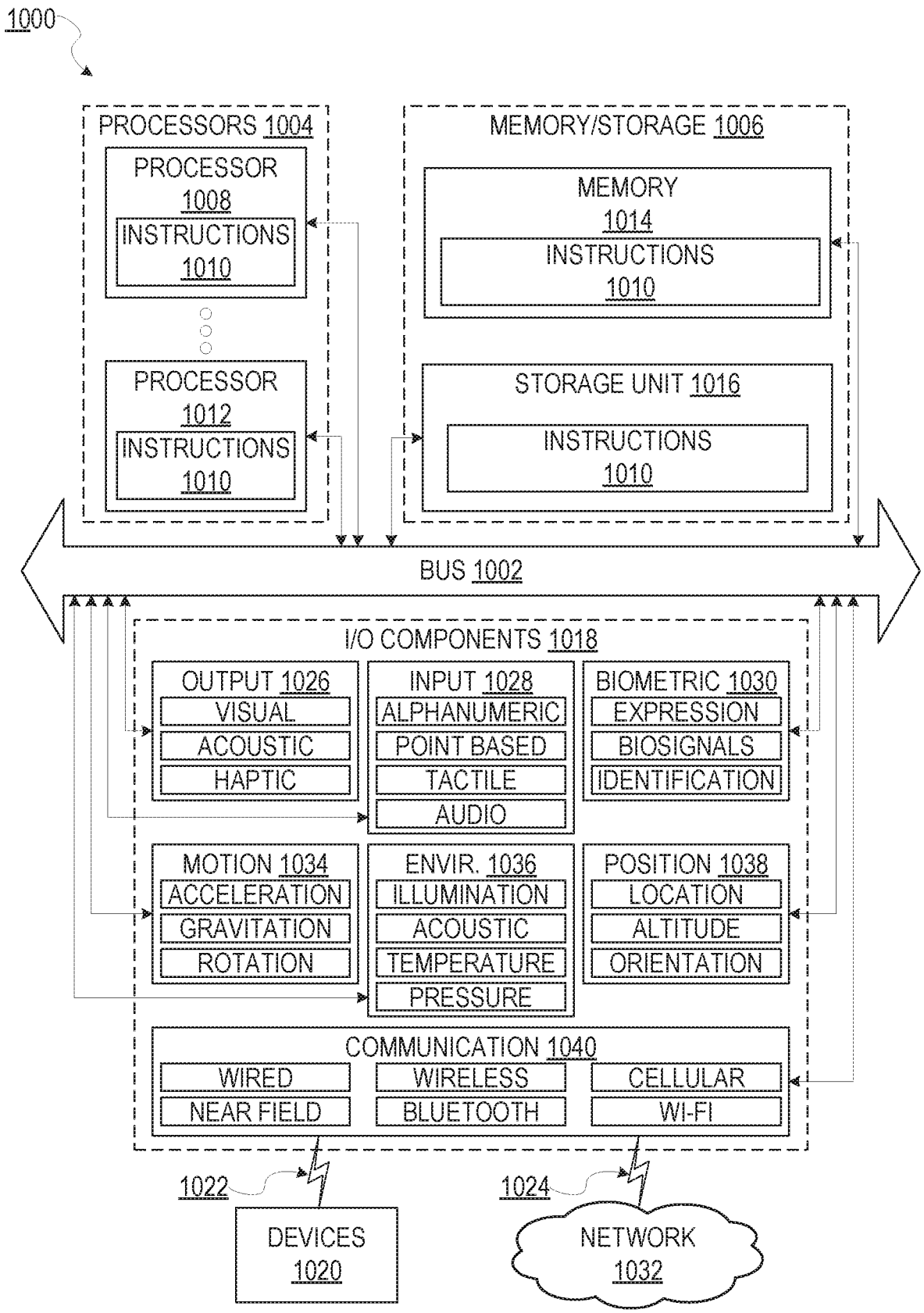
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions 1010 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010, embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000.

Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component, altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB). Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary:

"CARRIER SIGNAL." in this context, refers to any intangible medium that is capable of storing, encoding, or carrying transitory or non-transitory instructions 1010 for execution by the machine 1000, and includes digital or analog communications signals or other intangible medium to facilitate communication of such instructions 1010. Instructions 1010 may be transmitted or received over the network 1032 using a transitory or non-transitory transmission medium via a network interface device and using any one of a number of well-known transfer protocols.

"CLIENT DEVICE." in this context, refers to any machine 1000 that interfaces to a communications network 1032 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 1032.

"COMMUNICATIONS NETWORK," in this context, refers to one or more portions of a network 1032 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE." in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM." in this context, refers to a component, device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT." in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR." in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a CPU, a RISC processor, a CISC), a GPU), a DSP, an ASIC, a RFIC or any combination thereof. A processor 1004 may further be a multi-core processor having two or more independent processors 1004 (sometimes referred to as "cores") that may execute instructions 1010 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    receiving, from a client device of a creator, an indication of whether a front-facing camera or a rear-facing camera was used by the client device to capture a first video;
    associating, by one of more processors, the first video with the indication of whether the front-facing camera or the rear-facing camera was used by the client device to capture the first video for generating the first data;
    storing, by the one of more processors, a plurality of videos in a database;
    extracting, by the one of more processors, for the first video of the plurality of videos, the first data representing a first interaction performed by the creator of the first video in association with the first video;
    extracting, by the one of more processors, for the first video, second data representing a second Interaction performed by a consumer of the first video in association with the first video;
    performing, by the one or more processors, automated image recognition of a plurality of frames of the first video to detect a first object that appears in a series of consecutive frames of the plurality of frames of the first video;
    searching, by the one or more processors, for a label that is related to the first object in response to the detecting the first object that appears in the series of consecutive frames of the plurality of frames of the first video;
    obtaining, by the one or more processors, a label score associated with the label that is related to the first object;
    computing, by the one or more processors, a score for the first video based on the first data and second data and based on the label score;
    ranking, by the one or more processors, the first video relative to a remaining subset of the plurality of videos by comparing the computed score for the first video with respective scores of videos in the remaining subset of the plurality of videos;
    and generating, by the one or more processors, instructions to display on a graphical user interface of the client device a list of top videos generated based on the ranking the first video relative to the remaining subset of the plurality of videos.

2. The method of claim 1, wherein the second data representing the second interaction performed by the consumer includes information indicating one or more of: a duration of time of the first video has been viewed by a plurality of users including the consumer, whether the first video was shared between a threshold number of the plurality of users, and whether one of the plurality of users captured a screenshot of the first video.

3. The method of claim 1, further comprising dynamically adjusting the label score associated with the label over time.

4. The method of claim 3, further comprising: detecting a second object that appears together with the first object in the series of consecutive frames, wherein the label is associated with a combination of the first object and second object; and determining a confidence level of the label, wherein the score for the first video is further computed based on the confidence level of the label.

5. The method of claim 1, further comprising: aggregating a total watch time value representing a length of time of the first video has been viewed by a plurality of users; and normalizing the aggregated total watch time value to generate the second data.

6. The method of claim 5, wherein normalizing the aggregated total watch time value comprises: determining a number of followers associated with the first video based on a number of users who selected an option to follow the first video; computing an offset by multiplying the number of followers with a duration of the first video; and dividing the aggregated total watch time value by the offset.

7. The method of claim 1, wherein the first data and second data include a plurality of values associated with respective criteria of the first data and second data; and wherein computing the score comprises: obtaining a first plurality of weights associated with criteria of the first data;

obtaining a second plurality of weights associated with criteria of the second data; adjusting the plurality of values based on the first plurality of weights and second plurality of weights; and aggregating the adjusted plurality of values to compute the score.

8. The method of claim 1, further comprising: selecting, based on the ranking, a first subset of the plurality of videos having an associated score that exceeds a specified value; and generating a display that includes the selected first subset of the plurality of videos.

9. The method of claim 8, further comprising: receiving input from a curator that approves a given video in the first subset of the plurality of videos for inclusion in the list of top videos; and presenting to a plurality of users the list of top videos approved by the curator.

10. The method of claim 9, wherein presenting the list of top videos comprises: presenting, on a client device of a given one of the plurality of users, a user interface that includes first portion and second portion, the first portion comprising a first plurality of thumbnails each thumbnail representing a different video in the list of top videos and the second portion comprising a second plurality of thumbnails each thumbnail representing a second subset of the plurality of videos, wherein the first plurality of thumbnails includes low frame rate representations of corresponding videos in the list of top videos; and wherein the second plurality of thumbnails includes static image representations of corresponding videos in the second subset of the plurality of videos.

11. The method of claim 8, further comprising presenting in the display an option to filter the selected first subset of the plurality of videos based on criteria associated with the first data and second data.

12. The method of claim 8, further comprising presenting in the display an option to filter the selected first subset of the plurality of videos based on an approval status of each video of the first subset of the plurality of videos.

13. The method of claim 8, wherein each video of the first subset of the plurality of videos automatically plays from a starting position to an ending position, further comprising presenting an option to replay a given one of the first subset of the plurality of videos.

14. The method of claim 8, further comprising: receiving input from a curator that selects a given one of the first subset of the plurality of videos; and presenting the selected given one of the first subset of the plurality of videos to the curator in full screen with an option to rate the given one of the first subset of the plurality of videos.

15. A system comprising:
a processor configured to perform operations comprising:
receiving, from a client device of a creator, an indication of whether a front-facing camera or a rear-facing camera was used by the client device to capture a first video;
associating the first video with the indication of whether the front-facing camera or the rear-facing camera was used by the client device to capture the first video for generating the first data;
storing a plurality of videos in a database;
extracting for the first video of the plurality of videos, the first data representing a first interaction performed by the creator of the first video in association with the first video;
extracting for the first video, second data representing a second interaction performed by a consumer of the first video in association with the first video;

performing automated image recognition of a plurality of frames of the first video to detect a first object that appears in a series of consecutive frames of the plurality of frames of the first video;
searching for a label that is related to the first object in response to the detecting the first object that appears in the series of consecutive frames of the plurality of frames of the first video;
obtaining a label score associated with the label that is related to the first object;
computing a score for the first video based on the first data and second data and based on the label score;
ranking the first video relative to a remaining subset of the plurality of videos by comparing the computed score for the first video with respective scores of videos in the remaining subset of the plurality of videos; and
generating instructions to display on a graphical user interface of the client device a list of top videos generated based on the ranking the first video relative to the remaining subset of the plurality of videos.

16. The system of claim 15, wherein the operations further comprise: receiving, from a client device of the creator, an indication of one or more annotations comprising overlaid content that have been added to the first video by the client device; and associating, with the first video, the indication of the one or more annotations to generate the first data.

17. The system of claim 15, wherein the operations further comprise: detecting that a client device on which the first video is presented has captured a screenshot while the first video was being presented on the client device;
incrementing a value representing a number of times screenshots of the first video were taken in response to detecting that the client device has captured the screenshot while the first video was being presented on the client device;
and incrementing the score of the first video in response to determining that the value representing the number of times screenshots of the first video were taken corresponds to a threshold value.

18. A non-transitory machine-readable storage medium that includes instructions that, when executed by one or more processors of machine, cause the machine to perform operations comprising:
receiving, from a client device of a creator, an indication of whether a front-facing camera or a rear-facing camera was used by the client device to capture a first video;
associating the first video with the indication of whether the front-facing camera or the rear-facing camera was used by the client device to capture the first video for generating the first data;
storing a plurality of videos in a database;
extracting for the first video of the plurality of videos, the first data representing a first interaction performed by the creator of the first video in association with the first video;
extracting for the first video, second data representing a second interaction performed by a consumer of the first video in association with the first video;
performing automated image recognition of a plurality of frames of the first video to detect a first object that appears in a series of consecutive frames of the plurality of frames of the first video;
searching for a label that is related to the first object in response to the detecting the first object that appears in the series of consecutive frames of the plurality of frames of the first video;

obtaining a label score associated with the label that is related to the first object;

computing a score for the first video based on the first data and second data and based on the label score;

ranking the first video relative to a remaining subset of the plurality of videos by comparing the computed score for the first video with respective scores of videos in the remaining subset of the plurality of videos; and generating instructions to display on a graphical user interface of the client device a list of top videos generated based on the ranking the first video relative to the remaining subset of the plurality of videos.

19. The non-transitory machine-readable storage medium of claim 18, wherein: the first data representing the first interaction includes information indicating at least one of whether the creator used a front facing or rear facing camera of a user device to create the first video, whether the creator enhanced the first video using a zoom or a speed effect, or whether the creator added a filter, a lens, an object, a caption, an emoji, or a sticker to the first video; and the second data representing the second interaction performed by the consumer includes information indicating at least one of a duration of time the first video has been viewed by a plurality of users including the consumer, whether the first video was shared between a threshold number of the plurality of users, or whether one of the plurality of users captured a screenshot of the first video.

* * * * *

UNITED STATES PATENT AND TRADEMARK OFFICE
CERTIFICATE OF CORRECTION

| | |
|---|---|
| PATENT NO. | : 11,204,959 B1 |
| APPLICATION NO. | : 16/269269 |
| DATED | : December 21, 2021 |
| INVENTOR(S) | : Boyd et al. |

It is certified that error appears in the above-identified patent and that said Letters Patent is hereby corrected as shown below:

In the Claims

In Column 24, Line 6, in Claim 1, delete "Interaction" and insert --interaction-- therefor In Column 26, Line 42, in Claim 18, before "machine,", insert --a--

Signed and Sealed this
Thirty-first Day of October, 2023

Katherine Kelly Vidal
*Director of the United States Patent and Trademark Office*